United States Patent Office 3,011,867
Patented Dec. 5, 1961

3,011,867
PRECIPITATION OF MANGANESE CARBONATE
Jay Y. Welsh, Brainerd, Minn., assignor to Manganese Chemicals Corporation, Minneapolis, Minn., a corporation of Minnesota
No Drawing. Filed July 9, 1956, Ser. No. 596,412
1 Claim. (Cl. 23—61)

This invention relates to the production of manganese carbonate from an aqueous, $CO_2$-containing solution of an ammonio complex of manganese, and is concerned particularly with an improved mode of precipitating a manganese carbonate product from such solution. Reference is made, in this connection, to U.S. Patent No. 2,608,463, Reginald S. Dean, August 26, 1952, for a full description of the characteristics and properties of solutions of ammonio complexes of manganese. This application is a continuation-in-part of my copending application Serial Number 430,431, filed May 17, 1954, now abandoned.

It is known that manganese carbonate may be precipitated from a pregnant, $CO_2$-containing, strongly ammoniacal, aqueous solution of an ammonio complex of manganese by decomposing the complex, viz., by lowering the ammonia concentration of such solution; also that such removal of ammonia could be effected by heating the pregnant solution to drive off a substantial, although usually minor, part of its ammonia content. As heretofore customarily carried out, the precipitation of the carbonate has been effected by heating a batch of the pregnant solution to about the boiling point and holding it at that temperature for a sufficient interval to effect the precipitation of as much as possible of the dissolved manganese as manganese carbonate.

In attempting to convert to battery-grade manganese dioxide the manganese carbonate obtained by the above-described conventional precipitation procedure, I have observed that while all of the carbonate precipitates appeared to have the same chemical composition, the carbonates obtained from different batches might vary very markedly as regards the density characteristics of the carbonate, as regards the general handling and stability characteristics of the carbonate, as regards the extent of conversion of the carbonate to the dioxide, and as regards the depolarizing properties of the resulting manganese dioxide products derived from those carbonates by heating the latter in air under standard conditions for the oxidation. Thus, it has been found that their convertibility to the dioxide may vary between say 35% $MnO_2$ and 80% $MnO_2$ or more, and that the depolarizing properties of the eventual dioxide and products may vary to a similar extent; also it has been found that there is a direct relation between the apparent density of an oxidized carbonate—i.e., of an $MnO_2$ battery dioxide—and the apparent density of the carbonate from which it was derived by oxidation.

I have found that the apparent density and the general handling properties of the precipitated manganese carbonate can be controlled at the precipitation step, the controlling factors being the temperatures at which precipitation is effected and—to some extent at least—by the length of time the precipitate is retained in the hot agitated slurry in which it had been produced. Higher apparent densities and better handling characteristics are attained at higher precipitation temperatures and longer retention times.

It has been found also that the oxidizability of the precipitated manganese carbonate is influenced by at least three factors, viz.:

(a) The Mn concentration of the pregnant solution used;
(b) The temperature at which the carbonate is precipitated from such pregnant solution; and
(c) The manner in which the heating of the pregnant solution, to lower its $NH_3$ content, is effected.

I have found that the oxidizability is favorably influenced by precipitating the carbonate from pregnant solutions having a relatively high concentration of dissolved manganese in the form of an ammonio complex: the higher the Mn concentration the more readily and completely can the resulting precipitated manganese carbonate be oxidized to manganese dioxide—other conditions being the same. It is desirable that the Mn concentration be at least as high as 65 g./l., and preferably between 65 and 100 g./l.

Further, I have found that oxidizability of the precipitated manganese carbonate is favorably influenced by effecting the decrease in $NH_3$ concentration of the pregnant solution of relatively high Mn concentration at as low a temperature as possible. The following data illustrate this observation:

| Temperature of Precipitation | Convertibility of Carbonate to Dioxide | g./l. of Mn remaining in the Barren Liquor |
|---|---|---|
| 70° C | 37.5% $MnO_2$ | 2 grams. |
| 65° C | 52.2% | about 4 grams. |
| 60° C | 72.0% | about 6 grams. |
| 55° C | 78.6% | about 7 grams. |

It will be observed that a small incremental decrease in the precipitation temperature effects a relatively large increase in the convertibility of the resulting carbonate to dioxide by a standard oxidizing procedure. However, where the carbonate is not to be converted to dioxide it has been found that a carbonate which has been precipitated at very low temperature may be so readily oxidizable as to darken appreciably during drying: moreover, lower apparent density may create settling problems.

To summarize the foregoing findings: On the one hand higher precipitation temperatures, and somewhat longer retention times, favor production of carbonate having higher apparent densities and better handling characteristics, whereas, on the other hand lower precipitation temperatures favor production of more readily oxidizable— and more nearly completely oxidizable—carbonate which, however, has a materially lower apparent density.

In accordance with the present invention I effect the precipitation of manganese carbonate from a relatively highly concentrated, $CO_2$-containing, pregnant solution of an ammonio complex of manganese, e.g., a solution having an Mn concentration of from 65 to 100 g./l. by continuously introducing a stream of the latter, at normal room temperature, into an agitated body of "fluid mixture" maintained at a predetermined temperature within the range 65° C.–68° C. depending on the apparent density and other characteristics desired continuously withdrawing a stream of "fluid mixture" from said body at substantially the same rate pregnant solution is added thereto, and thereupon separating solids (i.e., the precipitated manganese carbonate) from liquids in the withdrawn fluid mixture. The so-separated carbonate is then dried, as in an indirectly fired kiln-type drier, at a temperature of from about 150° C. to near the oxidizing temperature of the carbonate, i.e., 240°–250° C.

By the expression "fluid mixture" as used herein I mean a substantially homogeneous mixture of (a) a suspension of freshly precipitated manganese carbonate in the barren solution resulting from such precipitation, and (b) freshly added pregnant solution.

In carrying out this procedure for continuous precipitation I prefer to establish a body of fluid mixture, of substantial volume and depth, in a closed tank provided, adjacent the bottom thereof, with a steam injector for introducing a controllable amount of live steam into said body of fluid mixture for maintaining the latter at the predetermined temperature of precipitation, e.g., at 65° C. Also adjacent the bottom thereof, but spaced a substantial distance from the steam injector, is a valved discharge conduit for drawing off a stream of fluid mixture and conducting the same to whatever separating means may be employed. The stream of fresh pregnant solution is introduced into the body of fluid mixture by means of a valved feed conduit which extends through the top closure of the tank and to, or just beneath, the surface of said body of fluid mixture.

Decreasing the ammonia concentration—for precipitating manganese carbonate from the pregnant solution—can, as will be apparent, be favorably influenced by maintaining a subatmospheric pressure above the body of fluid mixture. I have found that with the assistance of a partial vacuum the desired decrease in ammonia concentration may be effected at a temperature substantially lower than 55° C., i.e., at say 45° C. or even lower, if so desired.

In some cases where the precipitation of manganese carbonate has been conducted under such conditions that a considerable concentration of dissolved manganese, e.g., substantially in excess of 7 g./l., remains in the resulting mother liquor, it may be found expedient to effect the continuous precipitation in two stages, with separation of precipitated solids after each stage. In the second stage the body of fluid mixture may be maintained at substantially the same temperature as obtains in the first stage, e.g., at a temperature differing from the first by not more than a few degrees C.; or, in the second stage, the body of fluid mixture may be maintained at a somewhat higher temperature than obtains in the first stage. Thus, the first body of fluid mixture may be maintained at 62°–65° C., while the second body is maintained at 65°–68° C., the precipitate obtained in each stage being kept separate where the precipitate from the second stage exhibits a different—e.g., a less desirable—oxidizability to battery-grade manganese dioxide.

In the alternative, both the first and second stages may be effected at the same temperature but under differing degrees of pressure. For instance, the first stage may be operated at atmospheric pressure while the second is operated at a suitable subatmospheric pressure.

This ability, on the part of the present continuous precipitation procedure, to provide a very uniform product—as regards a desirably high apparent density, reasonably ready oxidizability and other characteristics—distinguishes the same from a batch precipitation procedure in that in the latter a substantial portion of the total carbonate (produced in the course of precipitating any single batch) is, of necessity, precipitated over a lower temperature range and hence has an apparent density lower than has that portion which was precipitated at a somewhat higher temperature level. In illustration, it may be pointed out that the lower density of the final product resulting from the low temperature precipitation of a portion of the manganese carbonate in the course of a batch-type precipitation process makes it impossible to meet the density specification for battery-grade manganese dioxide required in Signal Corps Specification No. 3175, whereas said density specification can be met by the product derived by the continuous precipitation procedure of the present invention wherein the entire precipitation is carried out at a temperature of 65°–68° C. and with nominal time of retention of the precipitate in the hot agitated slurry.

With more particular reference to the immediately preceding statement the following specific example is given as representing a preferred set of precipitation conditions for the production of an $MnCO_3$ product adapted to be oxidized to battery-grade dioxide, using the procedure previously described:

The agitated body of fluid mixture, which amounted to approximately 2,000 gallons, was maintained at 65° C., while fresh pregnant solution, at normal room temperature ($\pm 20°$ C.), was continuously fed thereto at one end of the tank at the rate of approximately 35 gallons per minute, the pregnant solution having an Mn concentration of about 60 g./l. of solution. Concurrently, the total volume of fluid mixture was maintained substantially constant by continuously withdrawing 36 gallons per minute therefrom at the opposite end of the tank. The estimated retention time was 55 minutes. The fluid mixture withdrawn from the tank was passed to a thickener where the precipitated carbonate was separated from the liquid phase. The so-separated carbonate was dried at 110° C. The product did not darken during or after drying. The dry carbonate had an apparent density of 23 gm. per cu. in. A portion of the dry carbonate was oxidized—in the manner described in my copending patent application Serial No. 588,239, filed May 31, 1956, entitled "Depolarizer," now abandoned, and the dioxide product was found to have the following composition and characteristics:

81% $MnO_2$
Apparent density 20 gms. per cu. in.
60.2% manganese

I claim:

In the process of precipitating manganese carbonate from a $CO_2$-containing ammoniacal pregnant solution of an ammonio complex of manganese containing manganese in a complex anion involving decreasing the ammonia concentration of such solution by heating, the improvement which consists in controlling the apparent density of the precipitated carbonate by effecting the lowering of the ammonia concentration and the consequent precipitation of manganese carbonate from a pregnant solution having an Mn concentration in excess of 65 g./l. by continuously adding said pregnant solution at normal room temperature to and admixing the same with a body of fluid mixture, of substantial volume and depth, maintained throughout the procedure at a predetermined temperature within the range 65°–68° C., said fluid mixture consisting essentially of fresh pregnant solution in admixture with a slurry of freshly precipitated manganese carbonate in barren liquor whereby continuous precipitation of manganese carbonate from pregnant solution is effected, and continuously withdrawing fluid mixture from said body, at a point remote from the point of addition of pregnant solution, at a rate to maintain the volume of said body substantially constant whereby the apparent density of the precipitated carbonate is maintained at a predetermined substantially constant level.

References Cited in the file of this patent

UNITED STATES PATENTS

| | | |
|---|---|---|
| 1,854,664 | Ogden | Apr. 19, 1932 |
| 2,346,140 | Pike | Apr. 11, 1944 |
| 2,608,463 | Dean | Aug. 26, 1952 |
| 2,625,462 | Fox | Jan. 23, 1953 |
| 2,684,891 | Hoek | July 27, 1954 |
| 2,762,703 | Mancke | Sept. 11, 1956 |